United States Patent
Lin et al.

(10) Patent No.: US 6,425,202 B1
(45) Date of Patent: Jul. 30, 2002

(54) MICROBE-MEDIATED METHOD AND APPARATUS FOR ATTRACTING MOSQUITOES

(75) Inventors: Hao-Jan Lin; Yi-Hung Lin; Kuang-Shing Chen, all of Taipei (TW)

(73) Assignee: Bioware Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 09/749,353

(22) Filed: Dec. 27, 2000

(51) Int. Cl.$^7$ .................................................. A01M 1/20
(52) U.S. Cl. ........................................ 43/107; 43/132.1
(58) Field of Search ......................... 43/107, 112, 132.1

(56) References Cited

U.S. PATENT DOCUMENTS

| | | | | |
|---|---|---|---|---|
| 2,113,409 A | * | 5/1938 | Niemeyer | 43/113 |
| 2,193,492 A | * | 3/1940 | Richardson | 43/107 |
| 4,694,604 A | * | 9/1987 | Mitchell | 43/114 |
| 5,274,949 A | * | 1/1994 | Beaton | 43/113 |
| 5,452,540 A | * | 9/1995 | Dowd et al. | 43/107 |
| 6,134,826 A | * | 10/2000 | Mah | 43/112 |

FOREIGN PATENT DOCUMENTS

| | | | | |
|---|---|---|---|---|
| IL | 98-00579 | * | 6/1999 | 1/2 |

* cited by examiner

*Primary Examiner*—Charles T. Jordan
*Assistant Examiner*—Danielle Rosenthal
(74) *Attorney, Agent, or Firm*—J.C. Patents

(57) ABSTRACT

The present invention provides a method and apparatus for generating the mosquito bait as well as simulating the human body's surface temperature and emanated odor. A well-controlled heating assembly can be used to generate a suitable thermal gradient for incubating both microorganisms and evaporating the bait. The bait comprises at least the bacterial decomposition and the yeast fermentation solution. The bait is not poisonous to human beings and produces mosquito attractants from natural products of fermentation or decomposition. The apparatus according to this invention comprises at least an upper compartment for trapping mosquitoes and a bottom compartment including the bait and the heating assembly. This invention can also combine with electrocution grids or insecticide webs to destroy attracted mosquitoes.

19 Claims, 3 Drawing Sheets

MICROBE-MEDIATED METHOD AND APPARATUS FOR ATTRACTING MOSQUITOES

BACKGROUND OF THE INVENTION

1. Field of Invention

The present invention relates to means for insect control. More particularly, the present invention relates to a microbe-mediated method of attracting mosquitoes for control purposes or for destroying mosquitoes.

2. Description of Related Art

Insect control has been in great demand throughout human history. It is necessary to control harmful insects like mosquitoes, to prevent the spread of disease, such as malaria and yellow fever. Public health authorities everywhere have expended intense effort on eliminating mosquito-related disease; however, this effort has not been wholly successful, largely because of the difficulty of eliminating mosquitoes. In addition to eliminating mosquito-related disease, another reason for eliminating mosquitoes is abatement of the nuisance caused by mosquito bites. Therefore, there has been a perennial call for means of effective mosquito control, including means to attract, capture, or destroy active mosquitoes.

Female mosquitoes seek a human host from which they obtain a blood meal for egg development. Mosquitoes locate hosts through a combination of chemicals characteristic of the hosts. It is believed that the volatiles emanating from the human host are responsible for the attractant. These volatiles contain 300–400 compounds and originate from either the secretions of skin glands, or the decomposition of the skin microflora, or both. The mosquitoes use their olfactory structures to detect the attractant from as far away as 90 meters.

Current methods of control only attack the mosquito population as a whole by chemical means or seek to remove their breeding sites. These methods are cumbersome, labor-intensive and often disruptive, in that they may introduce dangerous amounts of toxic chemicals into the environment. Some other attempts have been made to construct mosquito traps. For trapping mosquitoes, light, warmth, carbon dioxide, octenol, water vapor and lactic acid have all been used as attractants.

SUMMARY OF THE INVENTION

The invention provides a method for controlling mosquitoes by attracting mosquitoes using bacterial decomposition and yeast fermentation products as the attractants for blood-feeding female mosquitoes and for non-host seeking mosquitoes respectively. This invention has combined heat and simulating attractants to achieve a highly efficient attraction. The invention also comprises methods for trapping mosquitoes for control purposes or for destroying mosquitoes after attracting them.

Another objective of the present invention is to provide a method and apparatus for generating the mosquito bait, as well as simulating the human body's surface temperature and emanated odor. A well-controlled heating assembly can be used to generate a suitable thermal gradient for incubating both microorganisms and evaporating the bait. The bait comprises at least the bacterial decomposition and the yeast fermentation solution. The bait is not poisonous to human beings and produces mosquito attractants from natural products of fermentation or decomposition. This invention can also combine with electrocution grids or insecticide webs to destroy gathered mosquitoes.

As embodied and broadly described herein, the invention provides a portable mosquito controlling system for trapping mosquitoes, for use indoors or outdoors, the system comprising an upper compartment including a plurality of channels for admitting and trapping mosquitoes; a bottom compartment; and a thumbscrew container for connecting the upper compartment and the bottom compartment. The thumbscrew container includes at least an upper thumbscrew, a bottom thumbscrew and a grid between the upper thumbscrew and the bottom thumbscrew. The mosquito controlling system further comprises a first fixture for holding a first bottle containing at least a yeast fermentation, a second fixture for holding a second bottle containing at least a microbe culture and controllable heating means for generating heat for the microbe culture and the yeast fermentation.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
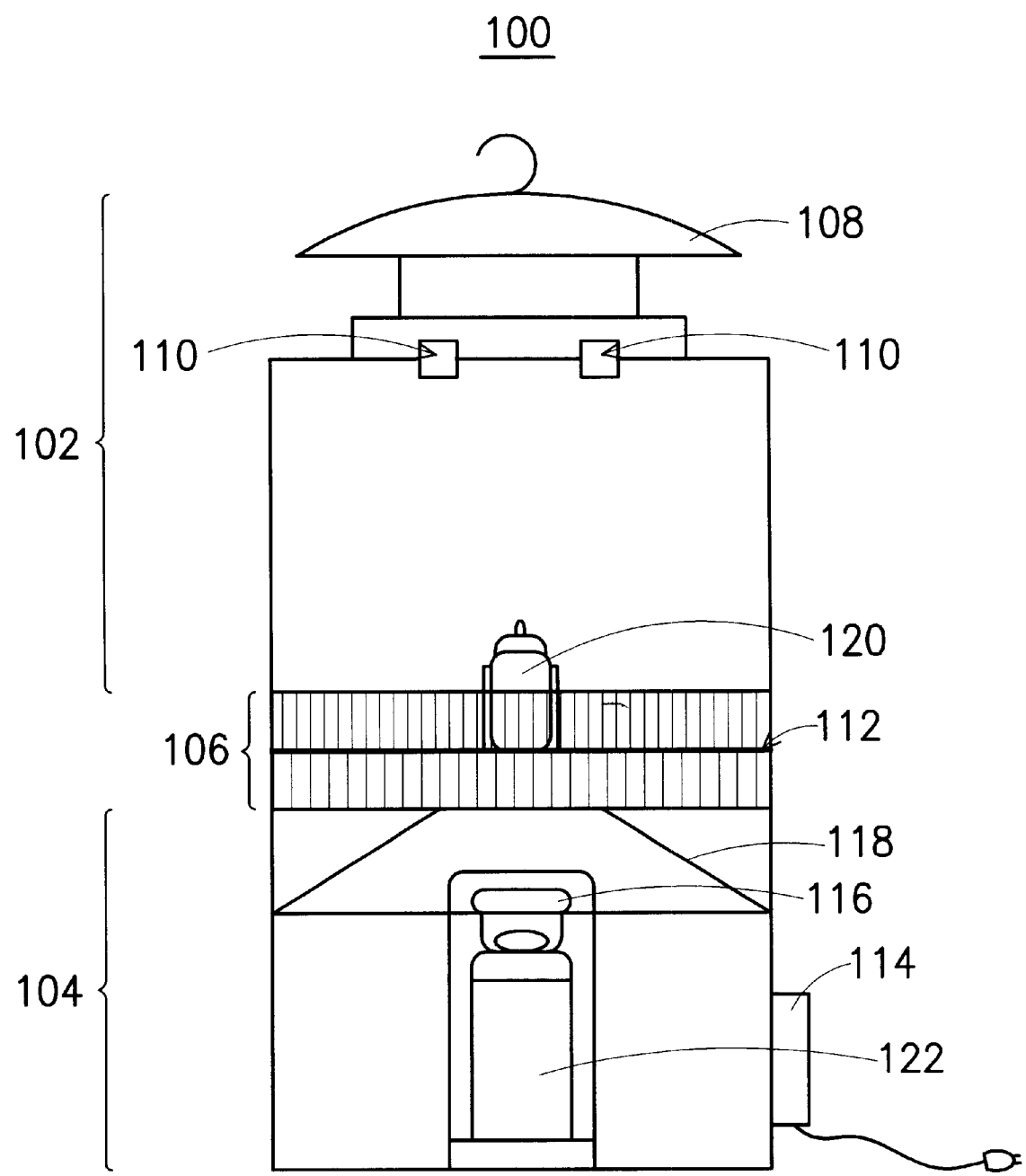
FIG. 1 is a display view of an apparatus according to one preferred embodiment of the invention.

Some Coryneform bacteria, existing in human sweat, are known to produce methanethiols that emanate as both cheese and foot odor. The microbes may be responsible for producing human odors from human perspiration. Evidence for direct microbial involvement in producing the volatile attractants in human hosts has been demonstrated by showing that incubation of sweat enhances its attraction. Therefore, it is very useful to identify these microbes and use these microbes for simulating human odors, as a means for attracting the haematophagous mosquitoes.

Nectar is the only food source of male mosquitoes, while the females of many species take a sugar meal before engaging in blood feeding. For the host-seeking flight, sugar is presumably the energy source and the initial differences in energy reserves affect the response to host volatiles. Additionally, that $CO_2$ shows non-species limited attraction of mosquitoes has been reported in a dose-dependent response. In this invention, the mosquito attractants include at least a human odor simulator simulating human host volatiles, a sugar source and a $CO_2$ supply source. The human odor simulator is provided by specific bacteria decomposition, while a steady increased $CO_2$ concentration and a flavored sugar meal is provided by yeast fermentation using fruit juice as the culture medium.

Experimental data:

Some experiments were applied to mosquitoes, described as following:

Mosquitoes The *Aedes aegypti* were maintained and assayed at 23–25° C., 60–80% relative humidity, and 12 hrs light/12 hrs dark. Adults were kept in 30 cm3 gauze-covered covered cages and fed with a 10% (v/v) sugar solution. In the bioassay 30 of the 4–8 day-old females that had not received a blood meal were released into a dual-port olfactometer. The olfactometer consisted of a flight chamber (1.6 m×0.6 m×0.6 m) in which mosquitoes were released. Air pumped from the room source was filtered by charcoal, passed through two bottles of distilled water, and one of the two ports (5 cm diameter, 30 cm apart), and then released into the flight chamber. The odor source was placed in the port, where the temperature was kept at 30° C. by a water circulation system, while the room temperature was maintained at 23–25° C. The observation time of the bioassay was 15 minutes after releasing mosquitoes. All parts of the olfactometer were cleaned with 75% alcohol and blown with strong fans for 20 minutes between test series. In addition, to counteract the effect of any biased directional response of unknown origin, the positions of the treatment and control were alternated between ports after each test.

Bacteria Strains of two Coryneform bacteria, *Brevibacterium epidermidis* (BE) and *B. linens* (BL), purchased from Deutsche Sammlung von Mikrooranismen and Zellkulturen GmbH, Braunschweig, Germany and Food Industry Research & Development Institute, Hsinchu, Taiwan, ROC, respectively, were used for bioassay. The bacteria were grown in three different mediums: TSB, MB and NB. The ingredients of the three mediums are listed as following: TSB (15 grams of tryptone+5 grams of soytone+5 grams of NaCl/liter, pH 7.3), MB (50 grams of milk powder+2.5 grams of peptone/liter, pH 7.2), and NB (5 grams of peptone+1.5 grams of beef extract+1.5 grams of yeast extract+5 grams of NaCl/liter, pH 7.4) at 30° C., 200 rpm for two days.

In order to screen the different combinations of bacteria and medium for the highest efficiency of mosquito attraction, 4 ml of the 2-day-old bacterial cultures from different combinations were tested in the olfactometer.

As shown in Table 1, most Corynebacterial strains grown in any of these three mediums can attract mosquitoes, except for strain BE9585 that did not show attraction. Among them, strain BE9586 is the only one to show attraction with all three growing mediums, of which that cultured with the NB medium had the highest attraction percentage. In general, the attraction efficiency was not higher than 30% in the absence of the heating device.

TABLE 1

Bacterial cultures attracting adult female mosquitoes

| Strains | TSB | MB | NB |
| --- | --- | --- | --- |
| BE20660 | +[a] | − | − |
| BE9585 | − | − | − |
| BE9586 | + | + | +++ |
| BE20659 | NA[b] | + | NA |
| BL20158 | − | ++ | NA |
| BL20425 | − | + | NA |
| BL20426 | + | + | + |

[a]Degree of the mosquito attraction, approximately measured by percentage. "−" = no attraction, "+" = 10%, "++" = 20%, "+++" = 30%.
[b]Not available In order to further identify the attraction of strain BE9586 grown in the NB medium, the supernatant obtained from centrifugation of the bacterial culture was assayed in the olfactometer. Referring to Table 2, up to 86.7% of adult female mosquitoes were attracted toward the supernatant of the bacterial culture. This percentage of attraction was approximately 20% higher than NB medium alone and 25% higher than blank solution without the odor source. It suggests that volatiles emanating from decomposition of the bacterial culture can exclusively attract adult female mosquitoes. In this assay, the heating itself showed 61.7% attraction, higher than previous non-heated odor sources. In addition, the heating device may also function for better evaporation of the bacterial decomposition.

TABLE 2

Percentage of mosquitoes attracted toward the supernatant of the bacterial culture, conducted in the olfactometer.

| Supernatant[a] | Nutrient Broth[b] | Blank[c] |
| --- | --- | --- |
| 86.7 ± 4.2[d] | 67.5 ± 4.2 | 61.7 ± 11.8 |

[a]Supernatant of the bacterial culture collected by centrifugation at 10,000 xg for 10 minutes.
[b]Medium used for growing bacteria.
[c]No odor source placed in the olfactometer port.
[d]Numbers of the attracted adult female mosquitoes / 30 × 100%. Three replications were applied to this assay. In each replication, a new batch of 30 mosquitoes was released into the flight chamber.

FIG. 1 is a display view of an apparatus according to one preferred embodiment of the invention. Referring to FIG. 1, the apparatus 100 is divided into an upper compartment 102 and a bottom compartment 104, connected by a thumbscrew container 106. A shield 108 is connected to the top of the upper chamber 102 with a supporting means, such as a supporting stock with extension walls for leading mosquitoes into passing channels. The shield 108 is separated from the upper compartment 102 by a distance of about 1–2 cm. Under the shield 108, the top of the upper compartment includes a plurality of passing channels 110 that open inward to the internal space of the upper chamber 102. The passing channels 110 have openings large enough for mosquitoes to pass through, while the channels 110 open inward to prevent the escape of incoming mosquitoes. After the upper compartment 102 is fit into the thumbscrew container 106, a first bottle 120 is placed inside the upper compartment 102 and on a grid 112 of the thumbscrew container 106. The first bottle 120 comprises at least odor simulators and a steady source for supplying CO2, as well as a sugar source. Preferably, the human odor simulators and the steady source for CO2 can be provided by the yeast fermentation with a medium. The medium may contain juice, further serving as a sugar source.

Referring to FIG. 1, the bottom compartment 104 includes an adjustable heating assembly 114, comprising at least a time-control means and a temperature-control means. The time-control means can set up an application time based on the user's schedule. The temperature-control means can generate heat to a specific (set-up) temperature and maintain the temperature, and comprises, for example, at least a metallic heater 116 that is controlled by a logic circuit. The adjustable heating assembly 114 can be controlled by the user's set-up to generate a regulated thermal gradient for bacteria incubation and evaporation of the bacterial decomposition components. A second bottle 122 is placed inside the bottom compartment 104 and on the bottom of the bottom compartment 104. The second bottle 122 comprises host odor simulators, for example, bacterial decomposition. After incubating specific microorganisms (bacteria) with cultivating mediums, bacteria can generate metabolic products or decompose the cultivating medium so as to produce bacterial decomposition. Preferably, Corynebacterial strains and cultivating conditions used in previous experiments are used. For example, strain BE9586 grown in the NB medium

[5 grams of peptone+1.5 grams of beef extract+1.5 grams of yeast extract+5 grams of NaCl/liter pH 7.4] is used to provide bacterial decomposition. The heater 116 is provided inside the bottom compartment 104 and above the second bottle 122 for heating up the chamber of the bottom compartment 104, thus providing heat for microbe incubation in the second bottle 122. A conversion funnel 118 is used to gather the heat, provided by the heater 116, in the chamber of the bottom compartment 104 and transfer heat to the chamber of the upper compartment 102, thus providing heat for incubating the yeast fermentation. As a result, two different thermal zones are generated in two compartments. Preferably, the thermal zones of the upper and bottom compartments should maintain at about 30° C. and 37° C. respectively. These maintained thermal zones of the two compartments provide heat for microbe incubation of both microorganisms and for helping emanation of the attractants produced in the bacteria culture. Furthermore, the maintained thermal zone can simulate human body temperature and act as an attractant for attracting mosquitoes.

Experiments performed by the inventors for the effect of heat combined with odor simulators on the mosquito species *Aedes aegypti* showed that bacterial decomposition along with heat evaporation could attract 60% of the mosquitoes, more than the 44% of mosquitoes attracted by yeast fermentation in a 60 minutes observation. Moreover, the synergistic effect could be observed in the combination of bacterial decomposition, yeast fermentation and heat evaporation, as 85% of mosquitoes were trapped after a 12-hours incubation within the olfactometer. Using bacterial decomposition as the mosquito bait attracts more mosquitoes in a certain period when compared with other baits, probably due to the dominant influence of odors in host-seeking behavior of mosquitoes.

Figure 2A:
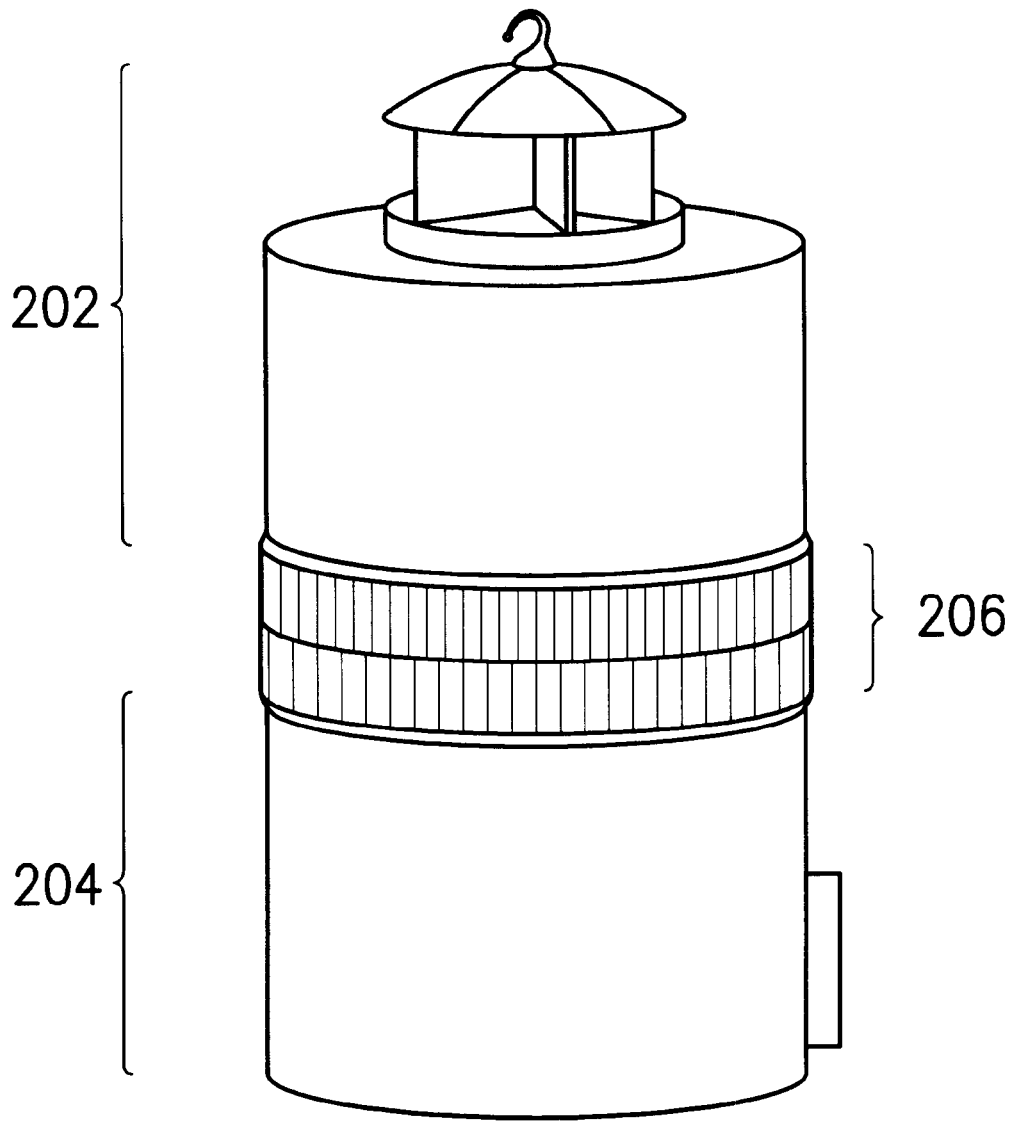
FIG. 2A is a perspective view of an apparatus according to one preferred embodiment of the present invention.
Figure 2B:
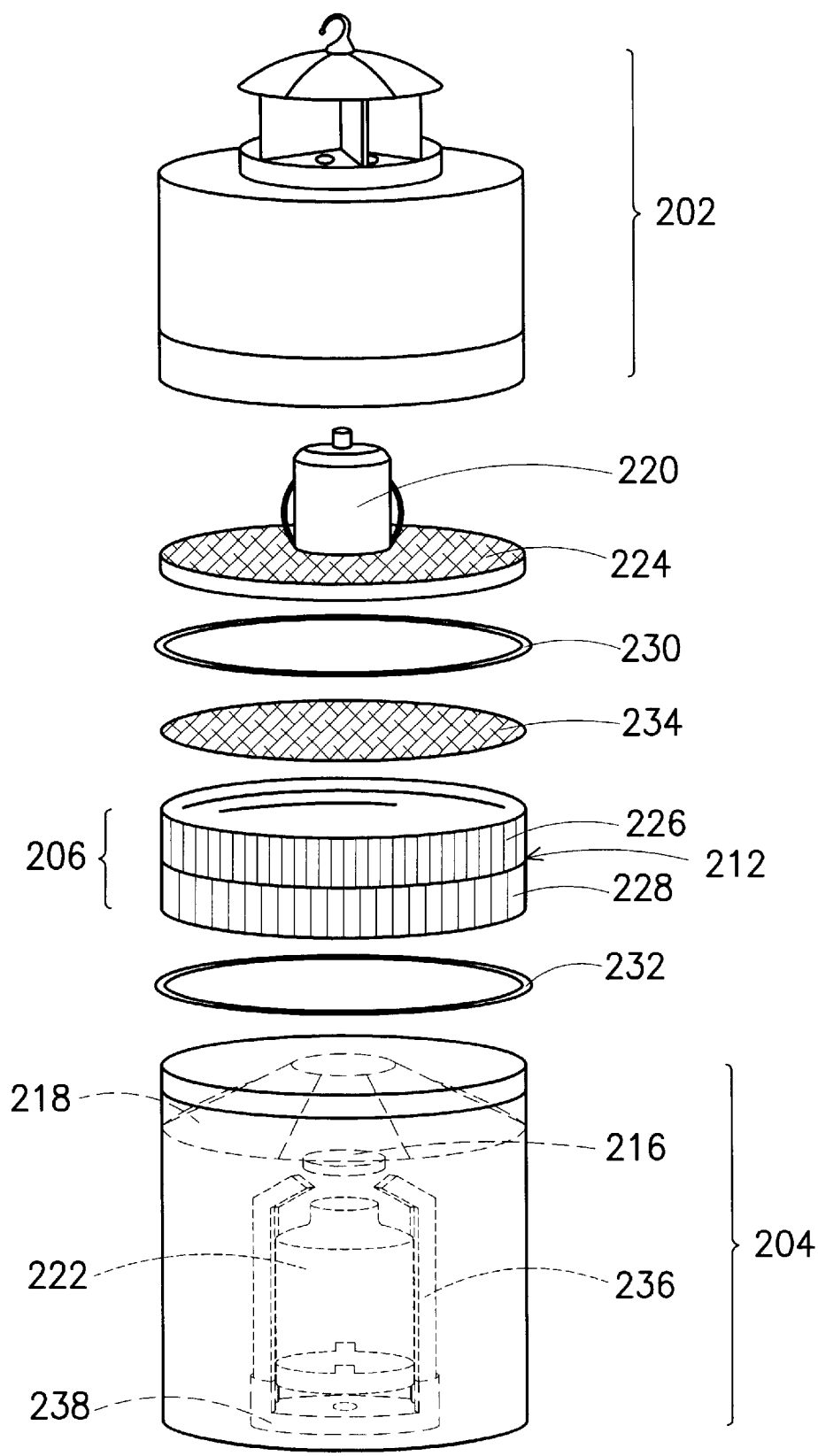
FIG. 2B is a partially exploded perspective view of the apparatus shown in FIG. 2A.

FIG. 2A is a perspective view of an apparatus according to one preferred embodiment of the present invention, while FIG. 2B is a partially exploded perspective view of the apparatus shown in FIG. 2A.

Referring to FIG. 2A, an apparatus 200 is shown with an upper compartment 202 and a bottom compartment 204, connected by a thumbscrew container 206.

Referring now to FIG. 2B, the apparatus 200 is shown in a partially exploded perspective view to further describe assembly details of the apparatus. A first bottle 220 is mounted on the center of a grid fixture 224. The thumbscrew container 206 has an upper thumbscrew 226 and a bottom thumbscrew 228 in order to fit the upper compartment 202 and the bottom compartment 204 respectively, as well as a grid 212 between the upper thumbscrew 226 and the bottom thumbscrew 228. A first O-ring 230 and a second O-ring 232 are used to seal up the upper compartment 202 and the bottom compartment with the thumbscrew container respectively. The grid fixture 224 is placed on the grid 212, so that the first bottle 220 is located inside the upper compartment 202 after the upper compartment 202 fits with the thumbscrew container 206. A collecting web 234 can be further included between the grid fixture 224 and the grid 212 for collecting dead mosquitoes. The collecting web 234 may also include a sticky material to trap mosquitoes or insecticides for killing mosquitoes. Furthermore, electric grids can also be included into the upper compartment 202 for killing mosquitoes.

Referring to FIG. 2B, the bottom compartment includes a bottle fixture 236 with a removable undercarriage 238, and a second bottle 222 is locked within the bottle fixture 236. The removable undercarriage 238 can be dismantled from the bottle fixture 236, so that the second bottle 222 can be refilled or cleaned. A heater 216 and a conversion funnel 218 are located above the bottle fixture 236. The conversion funnel 218 has a narrower opening facing the center of the grid 212 and a wider opening facing the chamber of the bottom compartment 204, so that heat gathered from the chamber can be transferred through the grid 212 to the upper compartment 202.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable mosquito controlling system for trapping mosquitoes, for use indoors or outdoors, comprising:
    an upper compartment including a plurality of channels, wherein the channels are opened inwardly for admitting and trapping mosquitoes;
    a bottom compartment;
    a thumbscrew container for connecting the upper compartment and the bottom compartment, wherein the thumbscrew container includes at least an upper thumbscrew, a bottom thumbscrew and a grid between the upper thumbscrew and the bottom thumbscrew;
    a first bottle, wherein the first bottle contains at least a first mosquito bait, wherein the first mosquito bait comprises at least a yeast fermentation;
    a second bottle, wherein the second bottle contains at least a second mosquito bait, wherein the second mosquito bait comprises at least a microbe culture;
    a first fixture for holding the first bottle in place;
    a second fixture for holding the second bottle in place; and
    controllable heating means controlled by a logic circuit for generating heat for the microbe culture and the yeast fermentation, wherein the controllable heating means is located above the second bottle within the bottom compartment for incubating the microbe culture.

2. The system as claimed in claim 1, wherein the first fixture is placed on the grid, so that the first fixture and the first bottle are located within the upper compartment after the upper compartment fits with the upper thumbscrew of the thumbscrew container.

3. The system as claimed in claim 1, wherein the second fixture and the second bottle are placed within the bottom compartment.

4. The system as claimed in claim 1, further comprising a collecting web between the first fixture and the grid.

5. The system as claimed in claim 4, wherein the collecting web further comprises a sticky material for trapping mosquitoes.

6. The system as claimed in claim 4, wherein the collecting web further comprises an insecticide for killing mosquitoes.

7. The system as claimed in claim 1, further comprising an electric grid in the upper compartment.

8. The system as claimed in claim 1, wherein the yeast fermentation further comprises a juice as a third mosquito bait.

9. The system as claimed in claim 1, wherein the microbe culture comprises a strain of Coryneform bacteria.

10. The system as claimed in claim 1, further comprising a conversion funnel in the bottom compartment in order to collect heat generated from the controllable heating means for incubating the yeast fermentation.

11. A method of controlling mosquitoes by trapping the mosquitoes, wherein the method comprises:

providing a mosquito trap, wherein the mosquito trap comprises at least means for admitting mosquitoes and means for trapping mosquitoes;

preparing a mosquito bait for attracting mosquitoes, wherein the mosquito bait comprises at least a yeast fermentation and a microbe culture;

placing the mosquito bait within the mosquito trap, so that mosquitoes attracted by the mosquito bait can be trapped by the mosquito trap;

providing heat for incubating the mosquito bait, wherein the heat can help emanation of odors from the mosquito bait, and wherein the heat simulates a body temperature and acts as an attractant for mosquitoes.

12. The method as claimed in claim 11, wherein the yeast fermentation further comprises a juice.

13. The method as claimed in claim 11, wherein the microbe culture comprises a strain of Coryneform bacteria.

14. The method as claimed in claim 11, wherein the mosquito trap further comprises using a sticky material for trapping mosquitoes.

15. The method as claimed in claim 11, wherein the mosquito trap further comprises using an insecticide for killing mosquitoes.

16. The method as claimed in claim 11, wherein the mosquito trap further comprises using an electric grid for killing mosquitoes.

17. A method of attracting mosquitoes, wherein the method comprises:

preparing a mosquito bait for attracting mosquitoes, wherein the mosquito bait comprises at least a yeast fermentation and a microbe culture, and providing heat for incubating the yeast fermentation and the microbe culture and for evaporating the mosquito bait to emanate mosquito attractants, wherein the mosquito attractants include at least a combination of odors from the yeast fermentation and the microbe culture that simulates a human being, and wherein the provided heat simulates a body temperature and acts as an attractant.

18. The method as claimed in claim 17, wherein the yeast fermentation further comprises a juice.

19. The method as claimed in claim 17, wherein the microbe culture comprises a strain of Coryneform bacteria.

* * * * *